United States Patent [19]
Johnson et al.

[11] Patent Number: 5,415,232
[45] Date of Patent: May 16, 1995

[54] METHOD AND APPARATUS FOR RAMPING OF STIMULATION CHEMICAL CONCENTRATIONS FOR TREATMENT OF SUBTERRANEAN FORMATIONS

[75] Inventors: Michael Johnson, Spring; Bennett Richard, Kingwood, both of Tex.

[73] Assignee: Baker Hughes Incorporated, Houston, Tex.

[21] Appl. No.: 186,386

[22] Filed: Jan. 21, 1994

[51] Int. Cl.⁶ .............................................. E21B 43/27
[52] U.S. Cl. ..................... 166/307; 166/53; 166/75.1; 166/250
[58] Field of Search ............ 166/307, 271, 75.1, 166/268, 250, 305.1

[56] References Cited

U.S. PATENT DOCUMENTS

| | | | |
|---|---|---|---|
| 3,160,207 | 12/1964 | McEver | 166/307 |
| 3,362,477 | 1/1968 | Brandt | 166/307 X |
| 3,670,819 | 6/1972 | Dauben et al. | 166/273 X |
| 3,930,539 | 1/1976 | Curtis | 166/307 X |
| 4,077,428 | 3/1978 | Weaver | 166/75.1 X |
| 4,646,835 | 3/1987 | Watkins et al. | 166/307 X |
| 4,845,981 | 7/1989 | Pearson | 73/151 |
| 4,901,563 | 2/1990 | Pearson | 73/151 |

OTHER PUBLICATIONS

Composite Catalog of Oil Field Equipment & Services, 36th Rev., 1984-85, vol. 2, Gulf Pub. Co., Houston, Tex., pp. 3847-3848.

Primary Examiner—Stephen J. Novosad
Attorney, Agent, or Firm—Fishman, Dionne & Cantor

[57] ABSTRACT

An acid concentration is injected into a formation in a manner which slowly changes the salinity and pH of the rock matrix of the formation to significantly reduce the effects on clay particles or fines in the formation. The acid concentration comprises a plurality of fluids which are injected into the formation in a ramped or stepped sequence. More specifically, one or more of the fluids are ramped or changed while the total flow rate is maintained by varying the flow rate of a dilution fluid or fluids. The volumes of the fluids forming the acid concentration and the rate or rates at which the volume percents are ramped will vary depending on the matrix of the formation being treated.

9 Claims, 5 Drawing Sheets

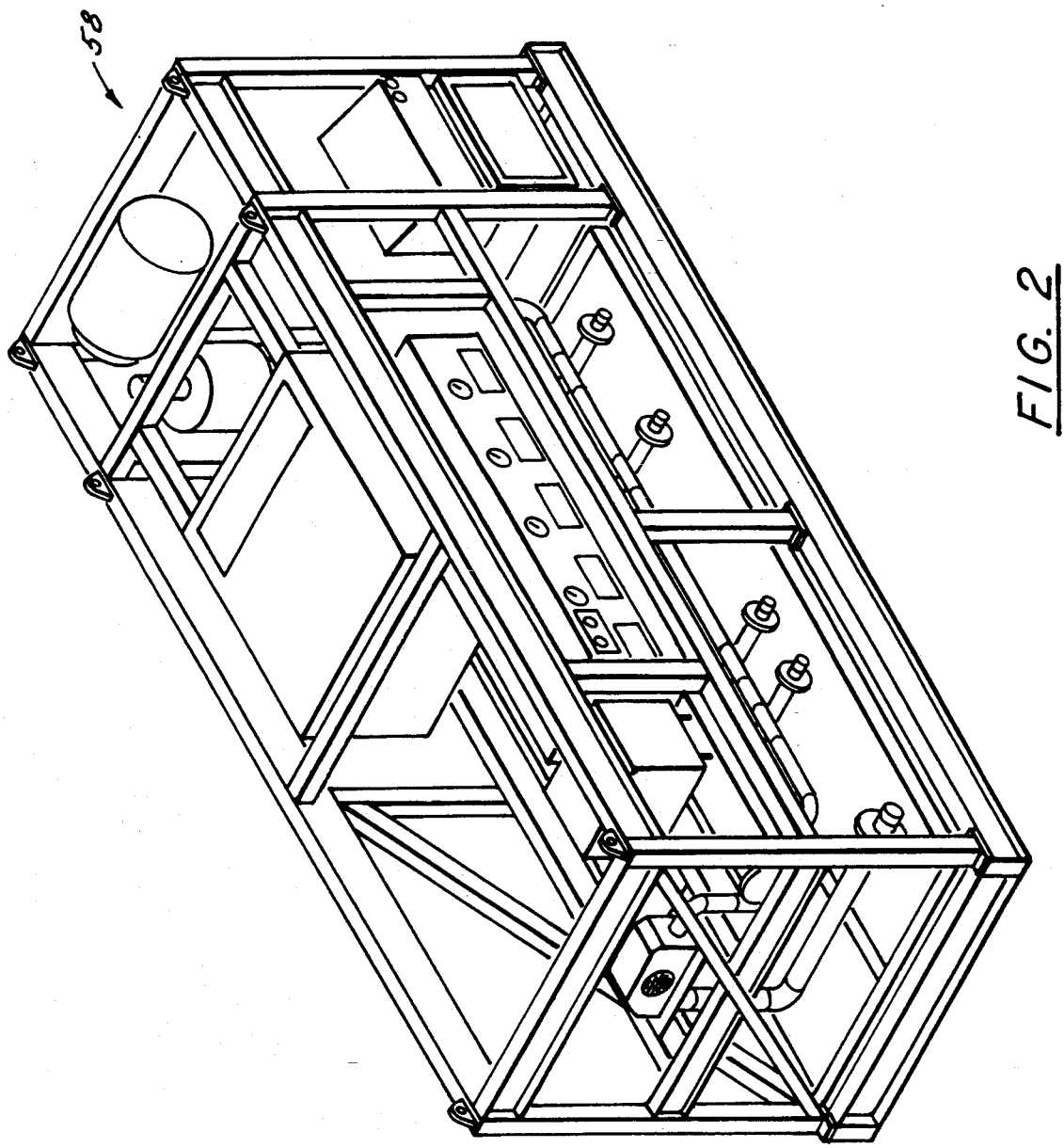

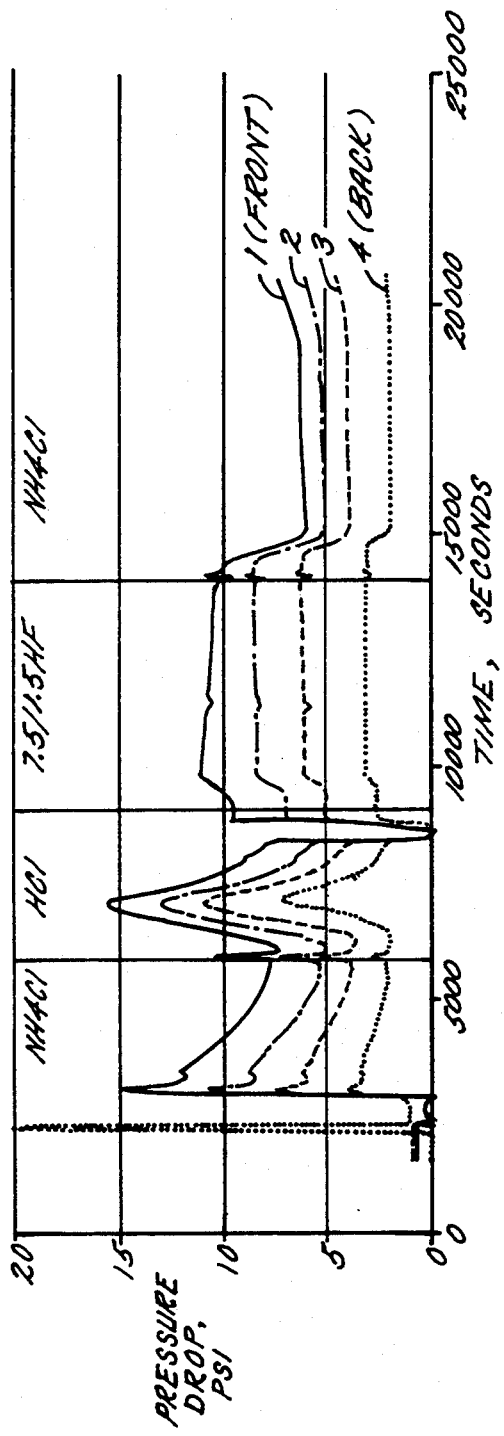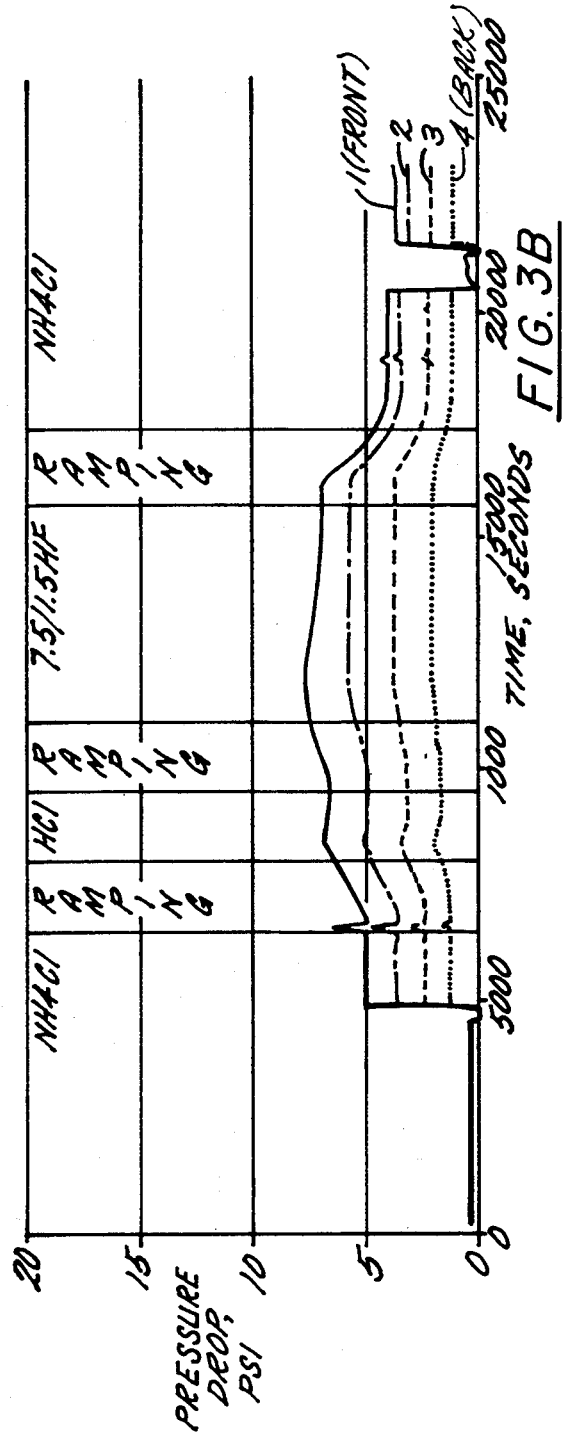

METHOD AND APPARATUS FOR RAMPING OF STIMULATION CHEMICAL CONCENTRATIONS FOR TREATMENT OF SUBTERRANEAN FORMATIONS

BACKGROUND OF THE INVENTION

The present invention relates to stimulation treatments of subterranean formations primarily in the field of oil well drilling. More specifically, the present invention relates to a method and apparatus for ramping of stimulation chemical concentrations for treatment of subterranean formations primarily in the area of acidizing a borehole.

Acidizing a borehole in the field of oil well drilling is well known. This process is generally employed when petroleum exists in a formation but is unable to flow readily into the borehole because the surrounding formation has a very low permeability to the petroleum. Certain formation compositions (e.g., limestone or dolomite) dissolve in response to a chemical reaction when exposed to certain acids. The acidizing process may be done with a drill rig in place, however this is not required. The acidizing process comprises injecting an acid (e.g., hydrochloric or other acid) into the formation under pressure. The acid etches the formation, enlarging pore spaces and passages thereby providing a way for the oil or gas in the formation to enter the borehole. The acid is held under pressure for a period of time and then pumped out. The borehole is then swabbed and put back into production. It is also known to combine chemical inhibitors with the acid to prevent corrosion of the drill pipe. The acid is currently batch mixed and pumped into the borehole through a tube at a specific concentration.

SUMMARY OF THE INVENTION

The prior art suffers from certain drawbacks and deficiencies, discussed more fully below, which are overcome or alleviated by the method and apparatus for ramping of stimulation chemical concentrations for treatment of subterranean formations of the present invention. It has been determined that during the prior art acidizing process, the only changes in acid concentration that occur are due to diffusion or density differences in the fluids (i.e., the batch mix) as they are pumped downhole. In view of this, the prior art acidizing process has been found to cause clay particles or fines from the formation to move or migrate due to sudden and violent changes in the environment of the rock matrix of the formation (i.e., changes in pH and salinity). These clay particles or fines tends to settle or deposit in the enlarged pore spaces and passages defined by the acidizing process, thereby restricting flow of the oil or gas in the formation to the borehole.

In accordance with the acidizing process of present invention, the acid concentration is injected into a formation in a manner which slowly changes the salinity and pH of the rock matrix of the formation to significantly reduce the effects on clay particles or fines in the formation. The acid concentration comprises a plurality of fluids which are injected into the formation in a ramped or stepped sequence. More specifically, one or more of the fluids are ramped or changed while the total flow rate is maintained by varying the flow rate of a dilution fluid or fluids. The volumes of the fluids forming the acid concentration and the rate or rates at which the volume percents are ramped will vary depending on the matrix of the formation being treated. This process of injecting the acid concentration into the formation results in a slow change to the environment in the formation matrix, which significantly reduces the effects on clay particles or fines in the formation, whereby clay particles or fines do not migrate into the enlarged pore spaces and passages defined by the acidizing process, thereby significantly improving flow of the oil or gas in the formation to the borehole relative to prior art acidizing processes.

In further accordance with the present invention, a plurality of reservoirs or tanks are provided to hold the individual fluids to be injected into the borehole. Each reservoir is connected to the input of a corresponding pump and the outputs of the pumps are connected to a common feed line. The feed line is connected to the input of a high pressure pump and the output of the pump is connected to a wellhead by a line. The fluids are conducted into the borehole through tubing connected to the wellhead. The rates at which the different fluids are drawn from the reservoirs are mechanically controlled to obtain the desired volume percents of the fluids in the ramped fashion described above.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 2 is perspective view of the pumping skid used in the apparatus of FIG. 1;

FIG. 3A is a plot of pressure drop as a function of time for each step of a treatment for the "batch mixing" test condition for a plurality of tests;

FIG. 3B is a plot of pressure drop as a function of time for each step of a treatment for the "ramped" test condition for a plurality of tests;

DESCRIPTION OF THE PREFERRED EMBODIMENTS

Figure 1:
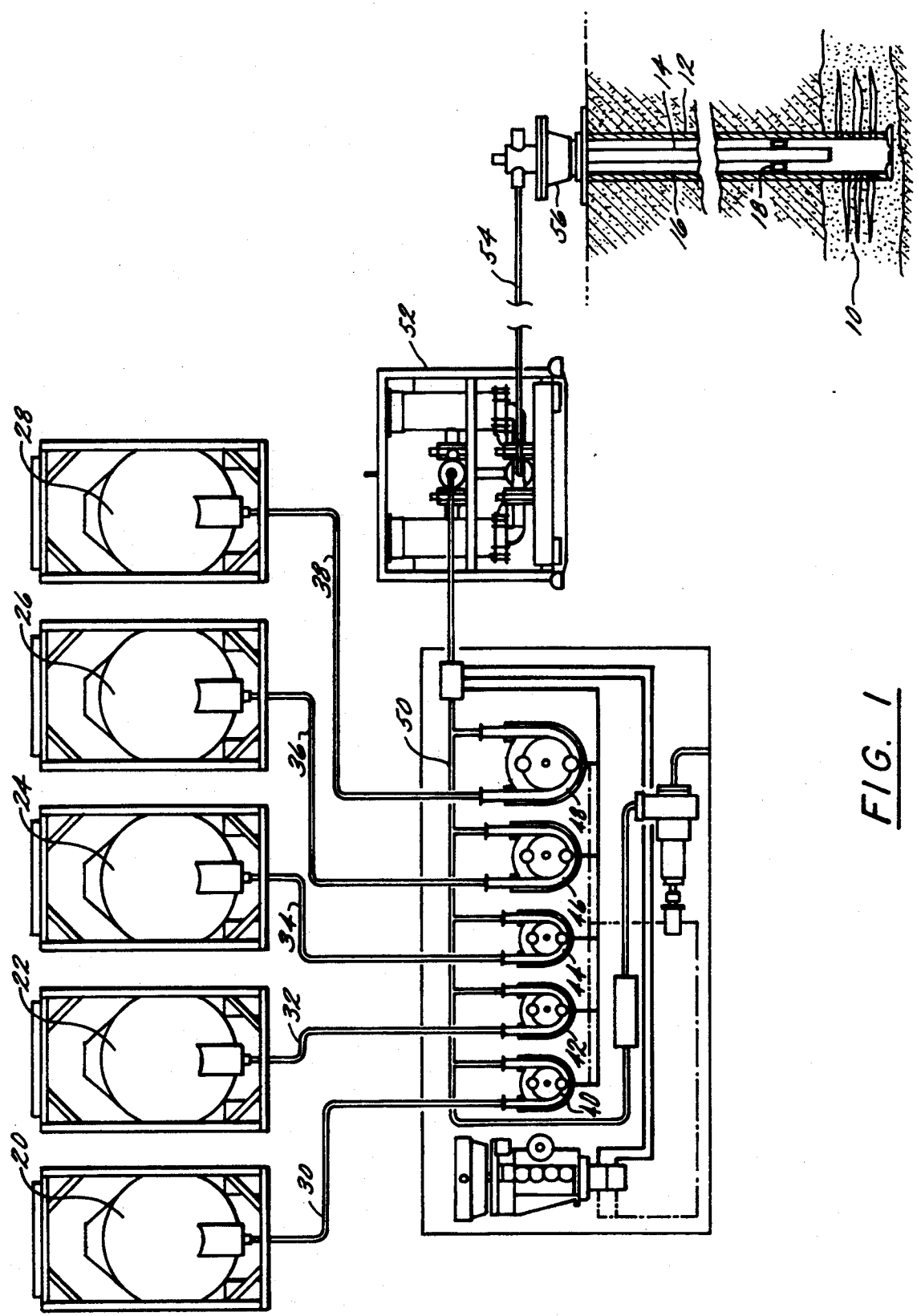
FIG. 1 is a diagrammatic view, partly a plan view and partly a cross sectional elevation view, of an apparatus for ramping of a stimulation chemical concentration for treatment of a subterranean formation in accordance with the present invention.

Referring to FIGS. 1 and 2, a system for ramping concentrations of stimulation chemicals for treatment of a zone of interest in a subterranean formation 10 having a borehole (or wellhole) 12 therein is presented. Pressurized fluid may be injected into the formation 10 through a tubing string 14 and suitable perforations in a casing 16 in an isolated area below a packer or the like 18 or into an open hole. A plurality of tanks or reservoirs 20, 22, 24, 26 and 28 each have fluid A–E, respectfully, stored therein, with one or more these fluids collectively comprising an acid concentration for the an acidizing process. Each tank 20, 22, 24, 26 and 28 is connected by a corresponding supply line 30, 32, 34, 36 and 38 to an input of a suitable corresponding pump 40, 42, 44, 46 and 48. The pumps 40, 42, 44, 46 and 48 at outputs thereof are connected by a common feed line 50 to a filter 52. The output of filter 52 is connected to an input of a high pressure pump 53. An output of high pressure pump 53 is connected by a feed line 54 to a wellhead 56 for conducting the fluids into the borehole through tubing 14 connected thereto. Pumps 40, 42, 44, 46 and 48 are preferably mechanically controlled in order to accurately regulate fluid flow from each of the tanks 20, 22, 24, 26 and 28, as described more fully below. However, these pumps may be computer controlled without departing from the spirit or scope of the present invention. A plurality of displays and gages are provided to monitor/regulate fluid flow rates and pressures. These displays and gages along with pumps 40, 42, 44, 46 and 48 are secured in a skid 58 which is easily transportable, for example, by truck.

The above described system allows for injection of the fluids into formation 10 in a manner which slowly changes the salinity and pH of the rock matrix of the formation to significantly reduce the aforementioned effects on clay particles or fines in the formation. By way of example, an acid concentration comprising fluids A, B, C, D and E is to be pumped into the well. Fluid A is pumped from tank 20 through line 30 by pump 40 to line 50, fluid B is pumped from tank 22 through line 32 by pump 42 to line 50, fluid C is pumped from tank 24 through line 34 by pump 44 to line 50, fluid D is pumped from tank 26 through line 36 by pump 46 to line 50, fluid E is pumped from tank 28 through line 38 by pump 48 to line 50. The volume percentages of one or all of these fluids can be changed or ramped. For example, the volume percent of fluid A is increased by increasing the flow rate of fluid A while the total flow rate of the acid concentration is held constant. This can be accomplished, since a dilution fluid (e.g., water) is included with the acid concentration. The dilution fluid is received at a port 60 and is pumped into line 50 by a pump 62. Accordingly, the percentage volume flow of the dilution fluid is reduced to maintain the constant total flow rate. It will be appreciated that any one or all of the fluids can be ramped or changed (including flow of a fluid stopped or started during this process) in this manner. The volume concentrations of the fluids not being changed are not affected (i.e., are maintained). The rates of fluid flow rate change can be a continuous ramp (linear or nonlinear) or incremental steps. The acid concentration (i.e., fluids A–E) is held under pressure in the borehole for a period of time and then pumped out. The borehole is then swabbed and put back into production. Further, chemical inhibitors may be combined with the acid to prevent corrosion of the drill pipe.

This process of injecting the acid concentration into the formation results in a slow change to the environment in the formation matrix, which significantly reduces the effects on clay particles or fines in the formation, whereby clay particles or fines do not migrate into the enlarged pore spaces and passages defined by the acidizing process, thereby significantly improving flow of the oil or gas in the formation to the borehole over the prior art.

While the above has described the acid concentration comprising fluids A–E, the acid concentration may comprise fewer or more fluids. Further, not all of the tanks need to contain fluids of the acid concentration, some of the tanks could contain a flushing fluid for use during preflushing and postflushing of the well. It will be appreciated that the flushing fluids are not blended with the acid concentration fluids in the ramped process, described above, but are individually injected into the well. The preflushing and postflushing steps could also be computer controlled to occur at the proper times (i.e., before and after the acidizing process, respectively).

EXAMPLES

The following sample tests have been run, which clearly show the advantages of the present invention over the prior art. These sample tests comprise samples using potted Berea cores, samples using one inch by six inch Berea cores in a ported core holder, and samples using one and one half inch by twelve inch Ohio Sandstone in a ported core holder. The Berea cores (i.e., 500 mD Berea) comprise: Quartz, 90%; Feldspar, 3%; Carbonate, 1%; Kaolinite, 3%; Illite, 1%; and Chlorite, 2%. The Ohio Sandstone core (i.e., 300 mD Ohio Sandstone) comprise: Quartz, 84%; Feldspar, 5% Carbonate, 1%; Kaolinite, 9%; Illite, 1%; and Chlorite, trace amounts. The treatment comprising: 3% NH4Cl saturation/preflush; 450 cm$^3$ 10% HCl containing, 0.1% A-100, 0.2% A-264, 25#/gal. A-400, and 10% S-90; 900 cm$^3$ 7.5% HCl/1.5% HF containing, 0.2% A-100, 0.2% A-264, 25#/gal. A-400, and 10% S-90: and 3% NH4Cl postflush. The test conditions were: rate, 9 cm$^3$/min.; temperature, 150° F.; back pressure, 500–800 psi; and net confining stress, 500 psi. The test conditions further comprised a 'no mixing' condition, 50 minutes of HCl (450 cm$^3$) followed by 100 minutes of HF (900 cm$^3$); and a 'ramped' condition, equal volumes of acid with rates stepped at 0.5 cm$^3$/min.

Referring to FIG. 3A, pressure drop is plotted as a function of time for each step of the treatment for a batch mixed (i.e., no mixing) test condition for each of four quarters of a twelve inch long core test plug. The pressure data is displayed cumulatively, so that each curve represents pressure drop relative to the end of the core test plug. Pressure drop across each quarter of the core test plug is represented as the space between any two curves. FIG. 3B is a similar plot for a "ramped" test condition in accordance with the present invention. These plots clearly indicate that without ramping sharp increases in pressure response occur as HCl is introduced. With ramping a rise in pressure is noted but it is not as sharp as the increases noted in the 'no mixing' test condition.

Figure 4:
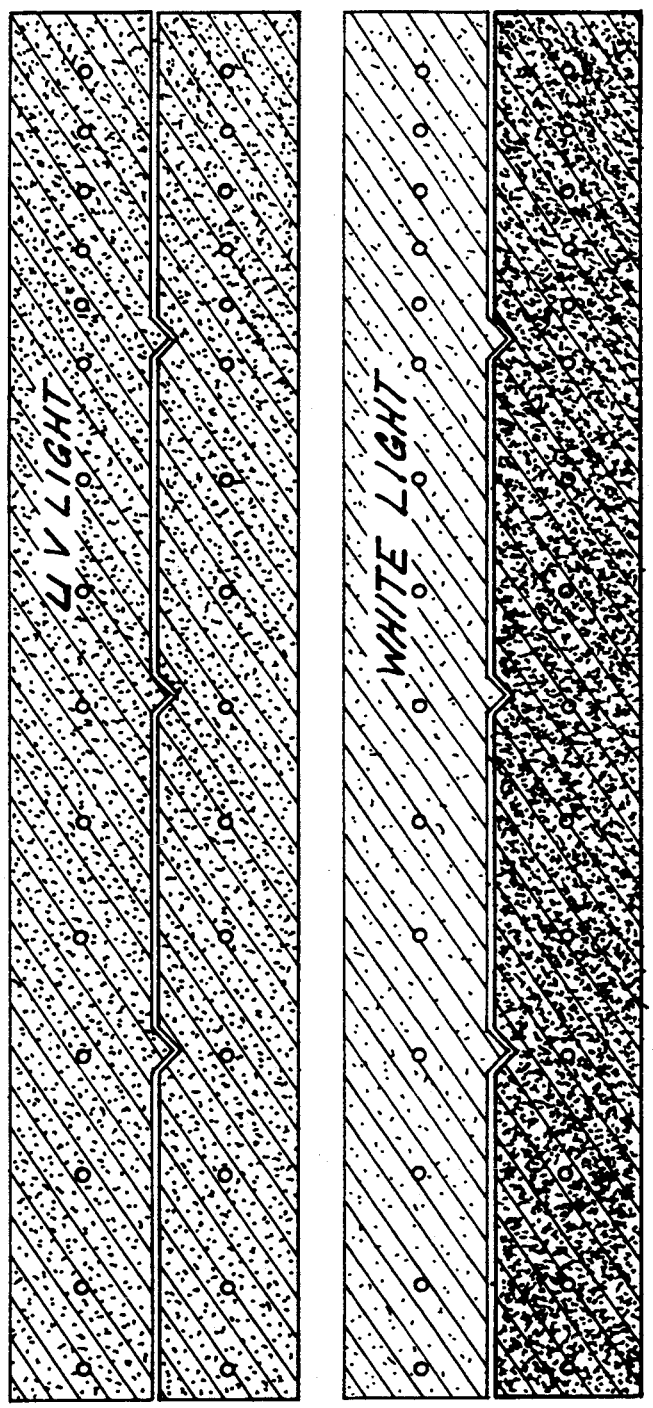
FIG. 4 is a view of a sectioned test core in both UV light and white light.
Figure 5:
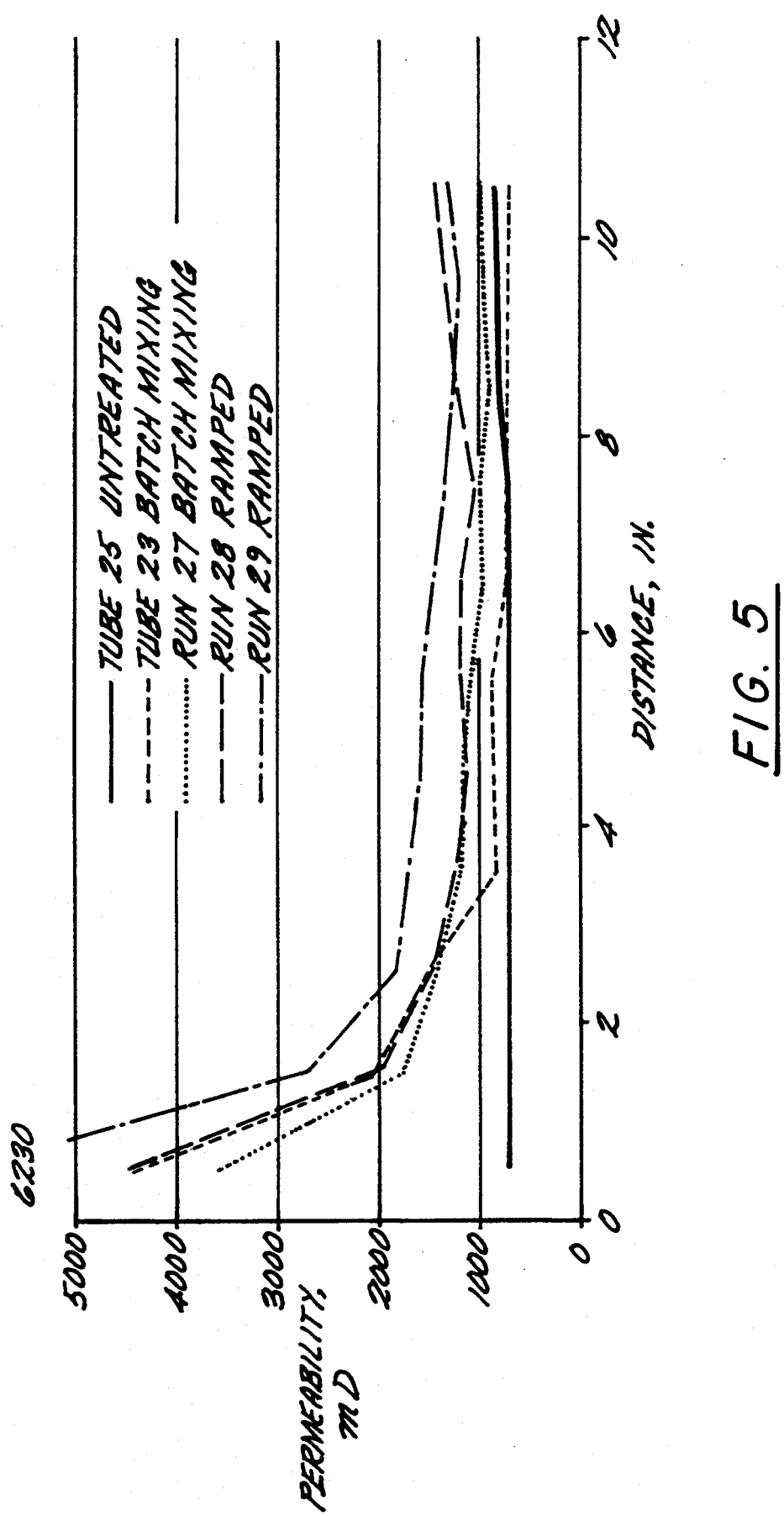
FIG. 5 is a plot of permeability as a function of distance for untreated, no mixing and ramped conditions.

Referring to FIG. 4, a longitudinally sectional representative test core is shown in both UV light and white light. These views of the core clearly show:

(1) the locations of permeability measurements which are reported graphically in FIG. 5, and (2) that the test fluids did uniformly penetrate the whole of the test plug, without bypass or channeling of the fluid flow.

Referring to FIG. 5, permeability is plotted as a function of distance for one untreated test core, two batch mixed treated test cores and two ramped treated test cores. These plots clearly show a significant improvement in permeability when the acid (i.e., the chemical concentration) is ramped, in accordance with the present invention. It will be appreciated that the beneficial effects of the ramped treatment may be observed clearly along the entire length of the test plug relative to the untreated plug, while beneficial effects of the "batch mixed" treatment do not appear to extend much beyond the first half of the core test plugs.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for stimulating a subterranean formation with a chemical concentration comprising a plurality of fluids, the method comprising the steps of:

injecting a volume of each one of the fluids of the chemical concentration at a selected concentration of a total flow rate into the formation;

injecting a volume of a dilution fluid at a selected concentration of the total flow rate into the formation;

changing the percentage concentration of at least one of the fluids of the chemical concentration injected; and changing the percentage concentration of the dilution fluid injected to maintain the total flow rate at a desired rate.

2. The method of claim 1 wherein said desired rate is a generally constant rate.

3. The method of claim 1 wherein said steps of changing each comprise changing at an incremental ramp rate.

4. The method of claim 1 wherein said steps of changing each comprise changing at a continuous ramp rate.

5. The method of claim 1 wherein said steps of injecting each comprise injecting under pressure.

6. The method of claim 1 further comprising the step of:

maintaining the chemical concentration in the formation under pressure for a period of time sufficient for increasing permeability of the formation.

7. The method of claim 1 further comprising the steps of:

preflushing the formation with a flushing fluid prior to said injecting steps; and postflushing the formation with said flushing fluid after completing said injecting steps.

8. The method of claim 7 wherein said flushing fluid comprises 3% NH4Cl.

9. The method of claim 1 wherein the fluids of the chemical concentration comprise:

10% HCl; and 7.5% HCl/1.5% HF.

* * * * *